(12) United States Patent
Takata

(10) Patent No.: US 7,821,209 B2
(45) Date of Patent: Oct. 26, 2010

(54) LIGHT SOURCE UNIT, ILLUMINATION APPARATUS FOR DISPLAY APPARATUS, AND DISPLAY APPARATUS

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 411 days.

(21) Appl. No.: 11/575,247

(22) PCT Filed: Sep. 6, 2005

(86) PCT No.: PCT/JP2005/016283

§ 371 (c)(1),
(2), (4) Date: Mar. 14, 2007

(87) PCT Pub. No.: WO2006/033228

PCT Pub. Date: Mar. 30, 2006

(65) Prior Publication Data

US 2008/0054820 A1    Mar. 6, 2008

(30) Foreign Application Priority Data

Sep. 21, 2004  (JP)  ............................. 2004-274232
May 27, 2005   (JP)  ............................. 2005-155659

(51) Int. Cl.
*H05B 41/16* (2006.01)
(52) U.S. Cl. ................... 315/276; 315/274; 315/291
(58) Field of Classification Search ............ 315/37–40, 315/54, 57, 88, 224, 274, 276, 291, 312; 345/102, 204; 313/491, 632–637
See application file for complete search history.

(56) References Cited

U.S. PATENT DOCUMENTS

| | | | | | |
|---|---|---|---|---|---|
| 4,195,249 | A | * | 3/1980 | Ariga et al. | ............. 313/493 |
| 4,326,233 | A | * | 4/1982 | Yanabu et al. | ............. 361/127 |
| 5,072,158 | A | * | 12/1991 | Schuda | ............. 315/276 |
| 6,034,485 | A | * | 3/2000 | Parra | ............. 315/209 R |
| 6,172,453 | B1 | * | 1/2001 | Hamada et al. | ............. 313/491 |
| 7,034,800 | B2 | | 4/2006 | Nakatsuka et al. | |

(Continued)

FOREIGN PATENT DOCUMENTS

JP    54-114474 U    8/1979

(Continued)

OTHER PUBLICATIONS

Official communication issued in the corresponding International Application No. PCT/JP2005/016283, mailed on Dec. 6, 2005.

*Primary Examiner*—Douglas W Owens
*Assistant Examiner*—Tung X Le
(74) *Attorney, Agent, or Firm*—Keating & Bennett, LLP

(57) ABSTRACT

A light source unit for use in, for example, a backlight for illuminating a display panel of a liquid crystal display apparatus, includes a cold-cathode tube having discharge electrodes provided one in each end portion of a glass tube whose interior is filled with a discharge gas. A coil as an inductance element is connected to at least one of the discharge electrodes of the cold-cathode tube so as to eliminate the difficulty in handling a cold-cathode tube caused by its having a negative characteristic such that, as the current flowing therethrough increases, the resistance across it decreases, causing the cold cathode-tube to succumb to current runaway.

15 Claims, 10 Drawing Sheets

U.S. PATENT DOCUMENTS

| | | | |
|---|---|---|---|
| 2002/0126718 A1* | 9/2002 | Hill | 372/39 |
| 2003/0048076 A1* | 3/2003 | Kanzaki et al. | 313/571 |
| 2003/0076040 A1* | 4/2003 | Kumada et al. | 313/631 |
| 2003/0127841 A1* | 7/2003 | Ashmead | 280/751 |
| 2004/0155596 A1* | 8/2004 | Ushijima et al. | 315/224 |
| 2004/0245930 A1* | 12/2004 | Tukamoto et al. | 313/631 |
| 2004/0256991 A1* | 12/2004 | Minamihata et al. | 313/626 |
| 2005/0127841 A1* | 6/2005 | Maseki et al. | 313/637 |
| 2008/0036393 A1* | 2/2008 | Ushijima et al. | 315/277 |

FOREIGN PATENT DOCUMENTS

| | | |
|---|---|---|
| JP | 59-170368 U | 11/1984 |
| JP | 60-1489 Y2 | 1/1985 |
| JP | 4-58936 U | 5/1992 |
| JP | 4-282528 A | 10/1992 |
| JP | 4-282529 A | 10/1992 |
| JP | 6-222721 A | 8/1994 |
| JP | 7-29548 A | 1/1995 |
| JP | 2003-244964 A | 8/2003 |
| TW | 556860 | 10/2003 |

* cited by examiner

FIG. 9A
FIG. 9B
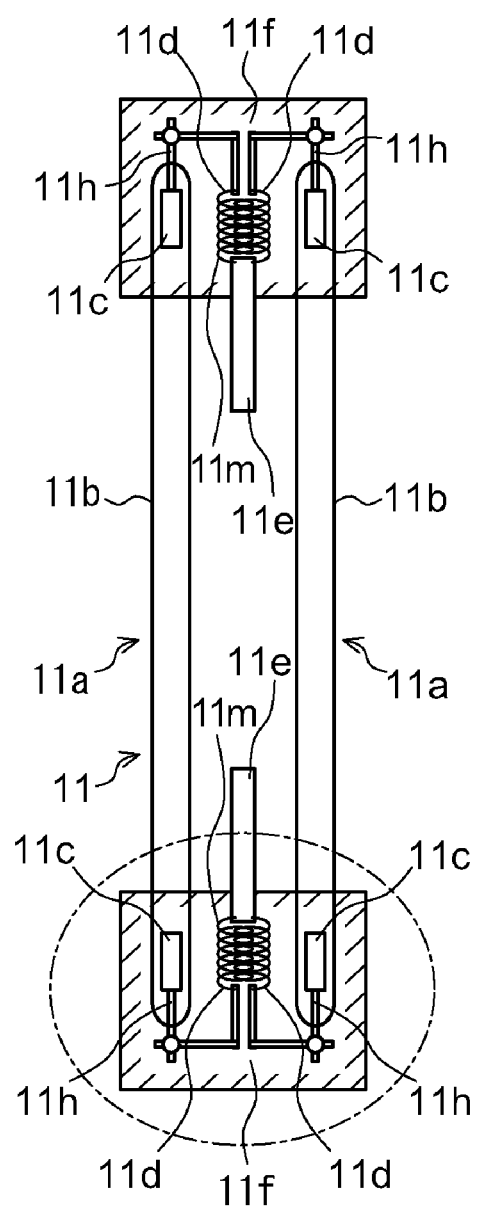
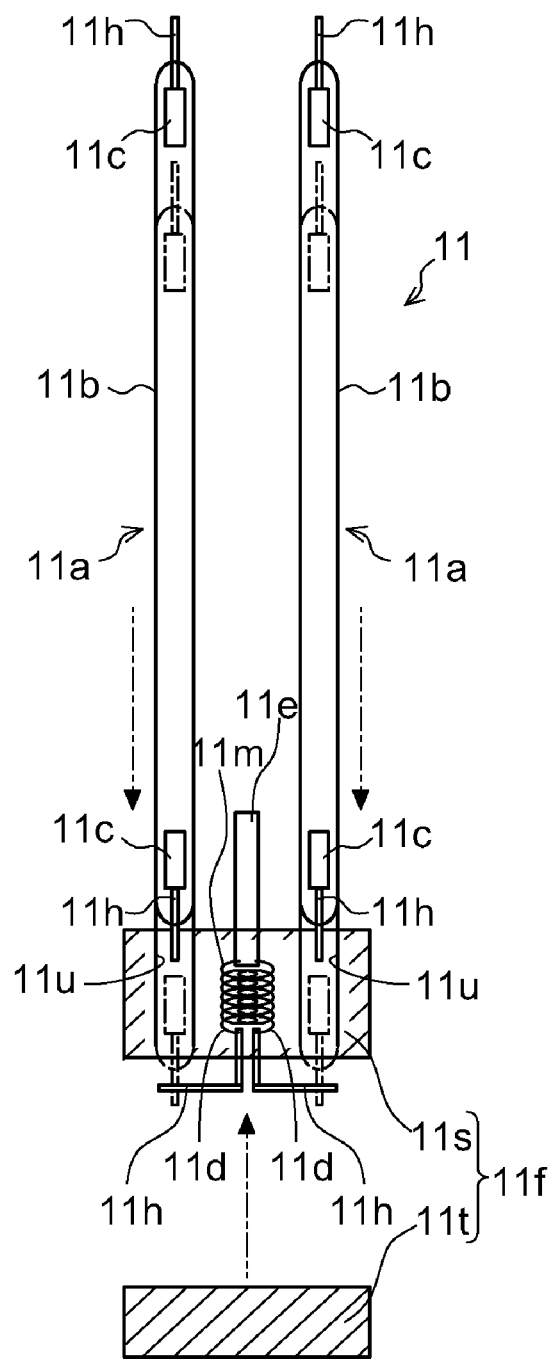

LIGHT SOURCE UNIT, ILLUMINATION APPARATUS FOR DISPLAY APPARATUS, AND DISPLAY APPARATUS

BACKGROUND OF THE INVENTION

1. Field of the Invention

The present invention relates to a light source unit suitable for use as a light source in a liquid crystal display apparatus or the like, relates also to an illumination apparatus incorporating such a light source unit and designed for use in a display apparatus, and relates further to a display apparatus incorporating such an illumination apparatus designed for use in a display apparatus.

2. Description of the Related Art

In liquid crystal display apparatuses widely used as display apparatuses, to achieve bright, easily readable display, a backlight is disposed behind a transmissive liquid crystal display panel. The backlight is typically built with a plurality of cold-cathode tubes. Each cold-cathode tube is composed of a glass tube filled with a discharge gas, and has discharge electrodes provided one inside each end portion of the glass tube. An intermittent electric current is fed from an inverter circuit, serving as a control circuit for controlling the cold-cathode tube, to the discharge electrodes to excite the discharge gas inside the glass tube, which causes the cold-cathode tube to light.

The cold-cathode tube has a characteristic (negative characteristic) such that, as the current fed thereto increases, the discharge gas inside the glass tube is excited such that the total number of electrons therein increases. As a result, the resistance across the cold-cathode tube decreases. Thus, when the cold-cathode tube is energized by being fed with a constant voltage from the control circuit, as the resistance across the cold-cathode tube decreases, the current further increases. An excessive increase in the current that flows through the cold-cathode tube may destroy it.

To overcome this problem, a method for preventing a cold-cathode tube from being fed with an excessive current has been used. FIG. 10 is a diagram schematically showing the configuration of a control circuit that is used to practice such a method. A cold-cathode tube 10a is composed of a glass tube 10b filled with a discharge gas, with discharge electrodes 10c provided one inside each end portion of the glass tube 10b. The discharge gas fills the interior of the glass tube 10b. The discharge electrodes 10c are connected to a connector 44 provided in a control circuit 40 configured as an inverter circuit.

The control circuit 40 includes a low-voltage alternating current source 41 and a step-up transformer 42 that steps up the voltage of the low-voltage alternating current outputted from the low-voltage alternating current source 41. The step-up transformer 42 produces an intermittent electric current, which is then fed via a current-limiting capacitor 43, serving as a ballast capacitor, to the connector 44, and is then fed from the connector 44 to the discharge electrodes 10c of the cold-cathode tube 10a. The control circuit 40 further includes a current feedback circuit 45 that controls, according to the current that flows through the cold-cathode tube 10a, the current fed from the current-limiting capacitor 43 to the cold-cathode tube 10a so that this current remains constant.

In the control circuit 40, the alternating-current voltage from the low-voltage alternating current source 41 is stepped up by the step-up transformer 42, and is then fed via the current-limiting capacitor 43 to the discharge electrodes 10c of the cold-cathode tube 10a. With this configuration, the current-limiting capacitor 43, by controlling the intermittent voltage outputted from the step-up transformer 42, controls the current fed to the cold-cathode tube 10a such that the current that flows through the cold-cathode tube 10a does not increase even as the resistance across it decreases.

On the other hand, Japanese Patent Application Laid-open No. H6-222721 discloses a configuration in which the capacitances of current-limiting capacitors are made variable for the purpose of making uniform the brightness of the cold-cathode tubes constituting a backlight.

In the configuration shown in FIG. 10, where the control circuit 40 includes the current-limiting capacitor 43, the voltage from the step-up transformer 42 is applied in a form divided between across the current-limiting capacitor 43 and across the cold-cathode tube 10a. Thus, when a predetermined voltage that needs to be applied across the cold-cathode tube 10a to make it start to light, the step-up transformer 42 needs to output an excessively high voltage. This greatly degrades the reliability of the control circuit 40 against high voltages, and makes it difficult to use long cold-cathode tubes that are designed for use in backlights for large-screen liquid crystal display panels, which inherently require high voltages. It is also necessary to greatly increase the size of the step-up transformer 42. This increases the footprint of the control circuit 40 on the circuit board, and leads to poor economy.

Moreover, the voltage obtained by the action of the current-limiting capacitor 43 greatly varies with the characteristics of the current-limiting capacitor 43, environmental conditions, and other factors, and this makes it difficult to feed a constant current to the cold-cathode tube 10a. For this reason, the control circuit includes the current feedback circuit 45, which feeds a constant current to the cold-cathode tube 10a. The provision of this current feedback circuit 45, however, contributes to the increased footprint on the circuit board and to poor economy. Moreover, where a plurality of cold-cathode tubes 50a are provided, a plurality of current feedback circuits 45 need to be provided one for each of them. This greatly increases the number of expensive feedback circuits needed, leading to poor economy and an increased footprint on the circuit board.

By contrast, when the control circuit 40 includes, for each of a plurality of cold-cathode tubes 10a, one step-up transformer 42, one current-limiting capacitor 43, and one current feedback circuit 45, part of the cold-cathode tubes 10a may fail to light, or, among the cold-cathode tubes 10a that have managed to light, the currents fed thereto may vary, resulting in uneven brightness among the cold-cathode tubes 10a. The lifetimes of the cold-cathode tubes 10a may also vary greatly. A backlight built with a plurality of cold-cathode tubes in this way cannot uniformly illuminate the entire display surface of a liquid crystal display panel, leading to poor display quality. This inconvenience is experienced not only in liquid crystal display apparatuses but also in display apparatuses of any other type in which a display panel is illuminated with a backlight.

SUMMARY OF THE INVENTION

In order to overcome the problems described above, preferred embodiments of the present invention provide a light source unit in which the current flowing through a cold-cathode tube is controlled so as to remain constant by being prevented from increasing excessively even as the resistance across the cold-cathode tube decreases when it is energized. Preferred embodiments of the present invention also provide an economical illumination apparatus for use in a display apparatus which can be driven with a control circuit composed of a small number of components and which permits easy designing of the control circuit, and also provide a display apparatus incorporating such an illumination apparatus.

According to a preferred embodiment of the present invention, a light source unit preferably includes a discharge light source tube having discharge electrodes provided one in each end portion of an insulating tube whose interior is filled with a discharge gas; and an inductance element that is electrically connected to at least one of the discharge electrodes of the discharge light source tube.

Preferably, the inductance element is disposed closer to the at least one of the discharge electrodes.

Preferably, the inductance element is a coil.

Preferably, the inductance element is a coaxial cable.

Preferably, the insulating tube has leads that are, at one end, connected to the discharge electrodes respectively and are, at another end, led out of the insulating tube, and the inductance element includes an electrically conductive ring, tube, or coil disposed around at least one of the leads.

Preferably, the discharge electrodes are each connected via a wire harness formed of a wiring member, and the inductance element is formed by shaping into a coil the wiring member connected to at least one of the discharge electrodes.

Preferably, the discharge electrodes are each connected via a wire harness, and the inductance element is a coil electrically connected to the wire harness via which electric power is fed to at least one of the discharge electrodes.

Preferably, a core member is disposed along the center axis of the coil.

Preferably, the inductance element is disposed inside an insulating material.

Preferably, the insulating material is rubber.

Preferably, the insulating material covers part of the discharge light source tube to serve as a holder for holding the discharge light source tube.

According to another preferred embodiment of the present invention, a light source unit preferably includes a plurality of discharge light source tubes each having discharge electrodes provided one in each end portion of an insulating tube whose interior is filled with a discharge gas; inductance elements that are, one for each of the discharge light source tubes, electrically connected to at least one of the discharge electrodes thereof, and a magnetic flux coupling member that is connected in series with the inductance elements and is magnetically coupled with the inductance elements.

According to another preferred embodiment of the present invention, an illumination apparatus for use in a display apparatus includes a light source unit including a discharge light source tube having discharge electrodes provided one in each end portion of an insulating tube whose interior is filled with a discharge gas, and an inductance element that is electrically connected to at least one of the discharge electrodes of the discharge light source tube; and a control circuit that produces an intermittent output voltage by stepping up, with a stepping-up transformer, a low-voltage alternating current from a low-voltage alternating current source. As a result of the output voltage being applied to the light source unit, the light source unit lights to illuminate a display panel.

According to another preferred embodiment of the present invention, an illumination apparatus for use in a display apparatus includes a light source unit including a plurality of discharge light source tubes each having discharge electrodes provided one in each end portion of an insulating tube whose interior is filled with a discharge gas, inductance elements that are, one for each of the discharge light source tubes, electrically connected to at least one of the discharge electrodes thereof, and a magnetic flux coupling member that is connected in series with the inductance elements and is magnetically coupled with the inductance elements; and a control circuit that produces an intermittent output voltage by stepping up, with a stepping-up transformer, a low-voltage alternating current from a low-voltage alternating current source. As a result of the output voltage being applied to the light source units, the light source units light to illuminate a display panel.

Preferably, as the aforementioned light source unit, a plurality of such light source units are provided, and the light source units are each connected in parallel with the control circuit so as to be driven thereby.

According to another preferred embodiment of the present invention, a display apparatus includes an illumination apparatus for use in a display apparatus like those described above; and a display panel illuminated by the illumination apparatus for use in a display apparatus.

In a light source unit according to various preferred embodiments of the present invention, the current that is fed to a cold-cathode tube is prevented from becoming excessively large. Thus, it is possible to prevent the current flowing through a cold-cathode tube from increasing excessively even as the resistance across it decreases when it is energized. This makes it possible to use the cold-cathode tube stably for a long period.

Moreover, in a light source unit according to various preferred embodiments of the present invention, in a case where it is provided with a plurality of discharge light source tubes, a constant current is fed to each discharge light source tube via a magnetic flux coupling member that magnetically couples together the inductance elements connected to the individual discharge light source tubes. This makes the brightness of the discharge light source tubes uniform, and makes it possible to economically build a simple, compact control circuit By the use of light source units as described above, an illumination apparatus for use in a display apparatus according to a preferred embodiment of the present invention can easily make less uneven the brightness of the individual light source units. Moreover, the control circuit for feeding currents to the light source units does not require a special circuit or the like for keeping the currents to the light source units constant. The control circuit thus has a simple configuration and is easy to design.

As a result of an illumination apparatus for use in a display apparatus as described above illuminating a display panel uniformly, a display apparatus according to preferred embodiments of the present invention offers enhanced display quality.

Other features, elements, processes, steps, characteristics and advantages of the present invention will become more apparent from the following detailed description of preferred embodiments of the present invention with reference to the attached drawings.

BRIEF DESCRIPTION OF DRAWINGS

FIG. 9A is a diagram schematically showing the construction of another example of the light source unit used in the backlight shown in FIG. 8A.

FIG. 9B is a diagram schematically illustrating how the light source unit shown in FIG. 9A is assembled.

DETAILED DESCRIPTION OF PREFERRED EMBODIMENTS

Figure 1A:
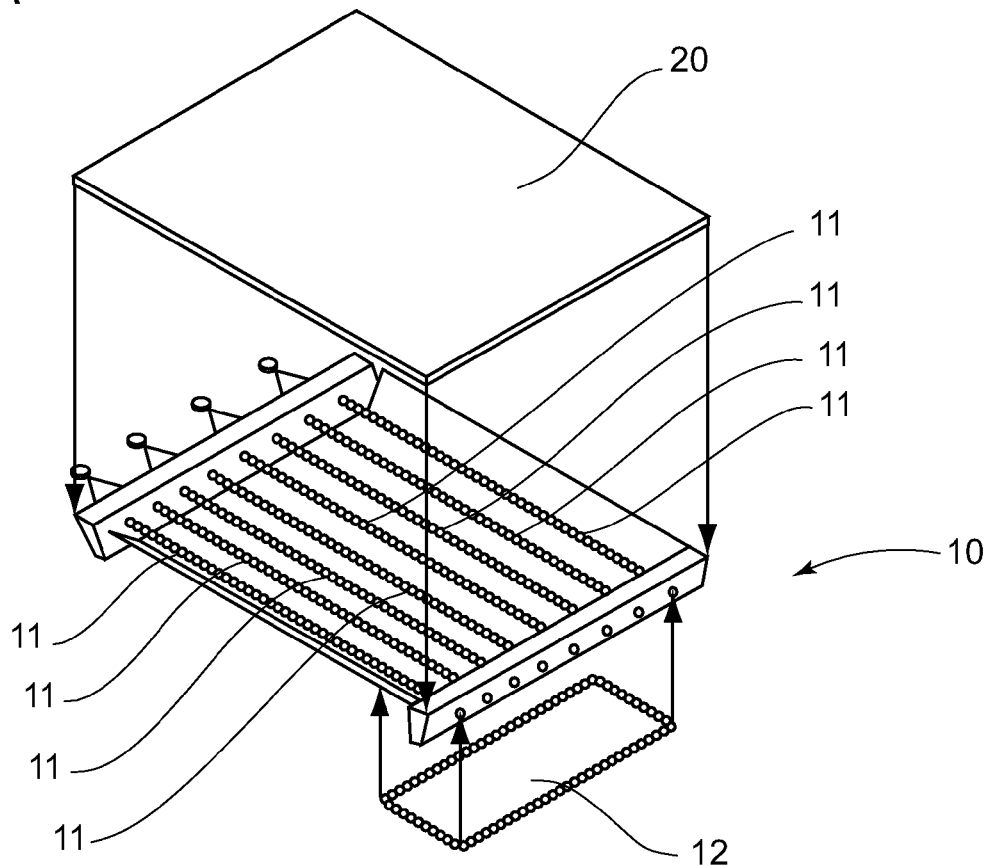
FIG. 1A is a perspective view schematically showing the construction of a display apparatus according to a preferred embodiment of the present invention.
Figure 1B:
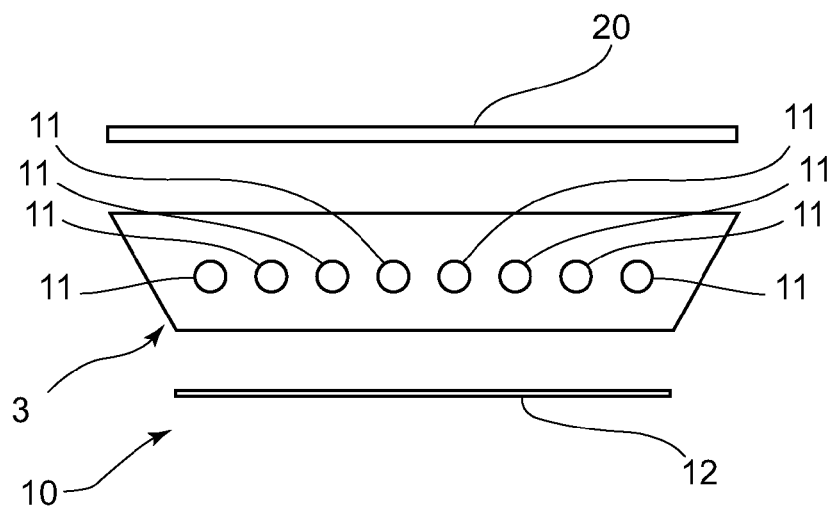
FIG. 1B is a sectional view schematically showing the display apparatus.

FIG. 1A is a perspective view schematically showing the construction of a liquid crystal display apparatus as an example of a display apparatus according to a preferred embodiment of the present invention, and FIG. 1B is a sectional view schematically showing the same liquid crystal display apparatus. The liquid crystal display apparatus shown in FIGS. 1A and 1B preferably has a backlight 10, as an illumination apparatus for use in a display apparatus, disposed behind a transmissive liquid crystal display panel 20. The transmissive liquid crystal display panel 20 is preferably of the ordinary active-matrix type, and uses TFTs (thin-film transistors) as active devices, for example.

The backlight 10 disposed behind the transmissive liquid crystal display panel preferably includes a plurality of light source units 11 arranged parallel to one another; and a control circuit 12 that controls the lighting of all the light source units 11. The light source units 11 provided in the backlight 10 are all constructed preferably in the same manner. The number of light source units 11 provided in the backlight 10 is determined according to the size of the transmissive liquid crystal display panel. For example, for a 32-inch transmissive liquid crystal display panel, there are typically provided 16 to 18 light source units 11. The backlight 10 also includes a reflective member (or reflective sheet) 3 that reflects the light emitted by the light source units 11 toward the liquid crystal display panel 20.

Figure 2:
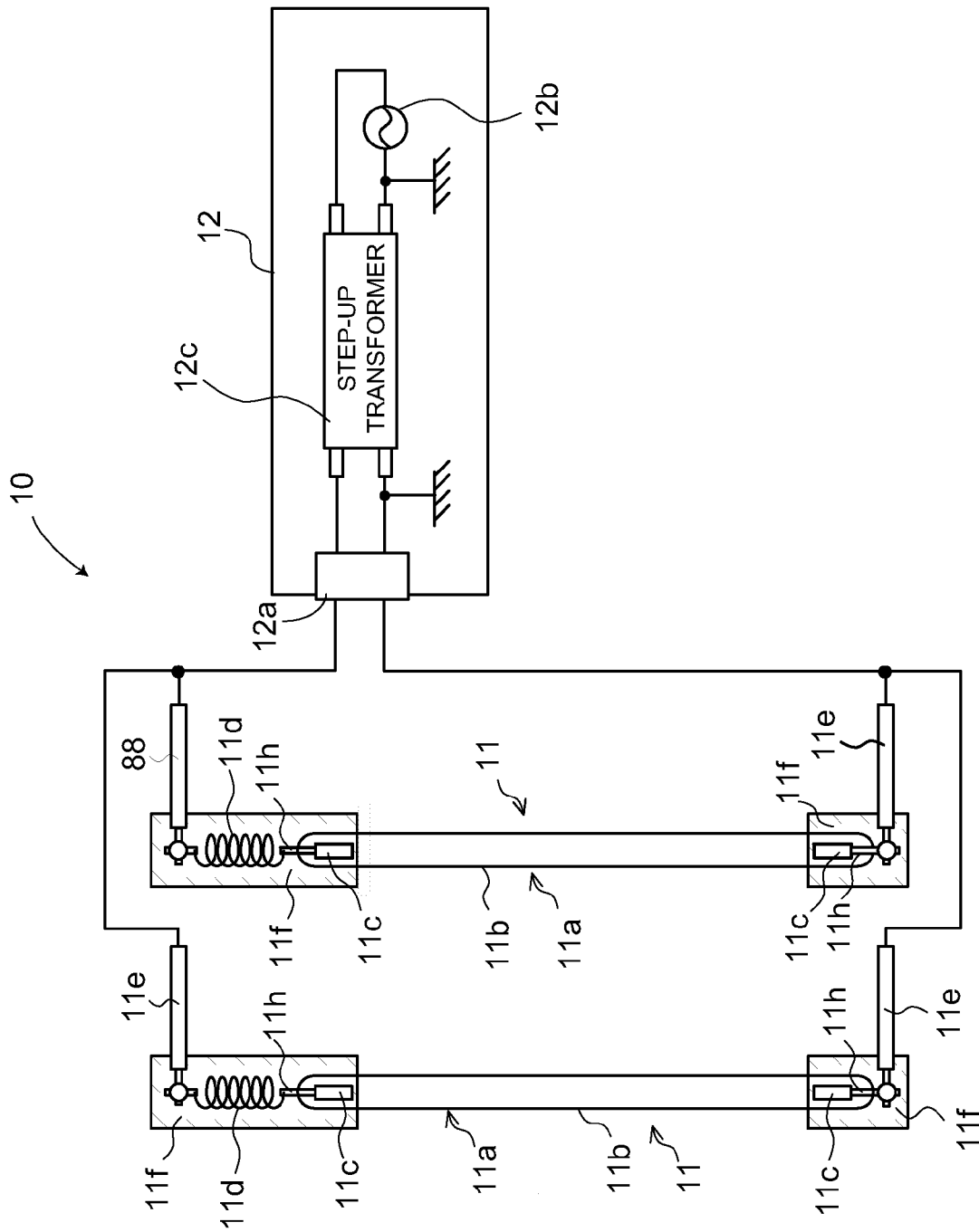
FIG. 2 is a diagram schematically showing the configuration of the backlight used in the display apparatus.

FIG. 2 is a diagram schematically showing the construction of an entire backlight 10. Each light source unit 11 has a cold-cathode tube 11a. The cold-cathode tube 11a has a glass tube 11b whose interior is filled with a discharge gas, and has discharge electrodes 11c provided one in each end portion of the glass tube 11b. Leads 11h are, at one end, connected to the discharge electrodes 11c respectively, and are, at the other end, led out of the glass tube 11b. For each cold-cathode tube 11a, one of the leads 11h is connected to one end of a coil 11d. The coil 11d is preferably arranged such that its center axis is aligned in the direction of the length of the cold-cathode tube 11a. The other end of the coil 11d is connected to one end of a wiring member 11e that is arranged in a direction that is substantially perpendicular to the center axis of the coil 11d. The other end of this wiring member 11e is connected to a connector 12a provided in a control circuit 12.

The lead 11h connected to the other discharge electrode 11c of each cold-cathode tube 11a is connected directly to a wiring member 11e that is arranged to extend in a direction that is substantially perpendicular to the direction of the length of the cold-cathode tube 11a. This wiring member 11e also is connected to the connector 12a provided in the control circuit 12.

The glass tube 11b is, at both end portions thereof, fitted with insulating holders 11f formed of an insulating material such as silicone rubber, for example. It should be understood that, in FIG. 2 and other figures, to keep the drawings simple, the hatching indicating the insulating holders 11f is shown only around the inner periphery of their outlines. One of the insulating holders 11f preferably covers the coil 11d, the part of the wiring member 11e where it is connected to the coil 11d, the lead 11h connected to the coil 11d, and the end portion of the glass tube 11b covering the discharge electrode 11c connected to that lead 11h. The other of the insulating holders 11f preferably covers the lead 11h connected to the wiring member 11e, the end portion of the glass tube 11b covering the discharge electrode 11c connected to that lead 11h, and the part of the wiring member 11e where it is connected to the lead 11h.

The two wiring members 11e provided in each light source unit 11 are connected individually to the connector 12a of the control circuit 12. The control circuit 12 preferably includes a low-voltage alternating current source 12b, and a step-up transformer 12c that steps-up the voltage of the low-voltage alternating current from the low-voltage alternating current source 12b. The step-up transformer 12c produces an intermittent voltage, which is fed via the connector 12a to the two wiring members 11e of each light source unit 11.

The coil 11d is an inductance element whose self-inductance varies according to a variation in the input voltage thereto. Specifically, the coil 11d has a characteristic (positive characteristic) such that, as the voltage intermittently outputted from the step-up transformer 12c increases, the impedance of the coil 11d increases.

In the backlight 10 constructed as described above, the alternating current from the low-voltage alternating current source 12b provided in the control circuit 12 is converted into an intermittent high voltage by the step-up transformer 12c, and this high voltage is intermittently applied to the two wiring members 11e connected to each light source unit 11.

Here, since one of the discharge electrodes 11c provided in each cold-cathode tube 11a is connected to the coil 11d serving as an inductance element, the greater a variation in the voltage intermittently applied from the step-up transformer 12, the higher the impedance of the cold-cathode tube 11a. This prevents the current flowing through the cold-cathode tube 11a in each light source unit 11 from increasing excessively as the resistance across it decreases when it is energized. Thus, it is possible to pass a constant current through each cold-cathode tube 11a. In this way, it is possible to minimize and eliminate the unevenness in the brightness of the individual cold-cathode.

Figure 3:
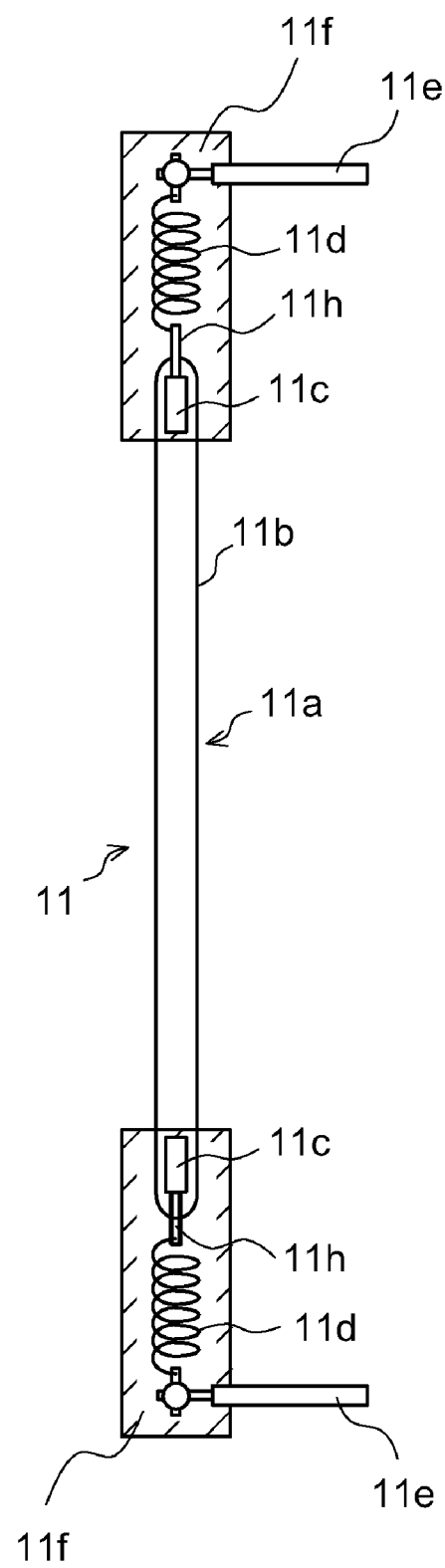
FIG. 3 is a diagram schematically showing the construction of an example of the light source unit used in the backlight.

The light source unit 11 may be constructed in any manner other than that described above. For example, as shown in FIG. 3, coils 11d as inductance elements may be connected one to each of the leads 11h connected respectively to the discharge electrodes 11c provided one in each end portion of the cold-cathode tube 11a, with the center axis of the coils aligned in the direction of length of the cold-cathode tube 11a.

Figure 4A:
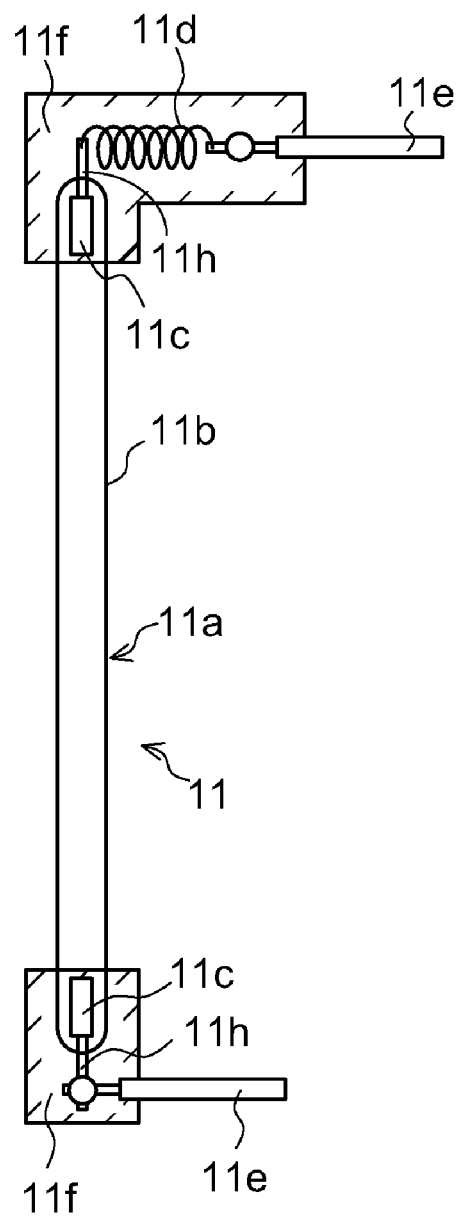
FIG. 4A is a diagram schematically showing the construction of another example of the light source unit.
Figure 4B:
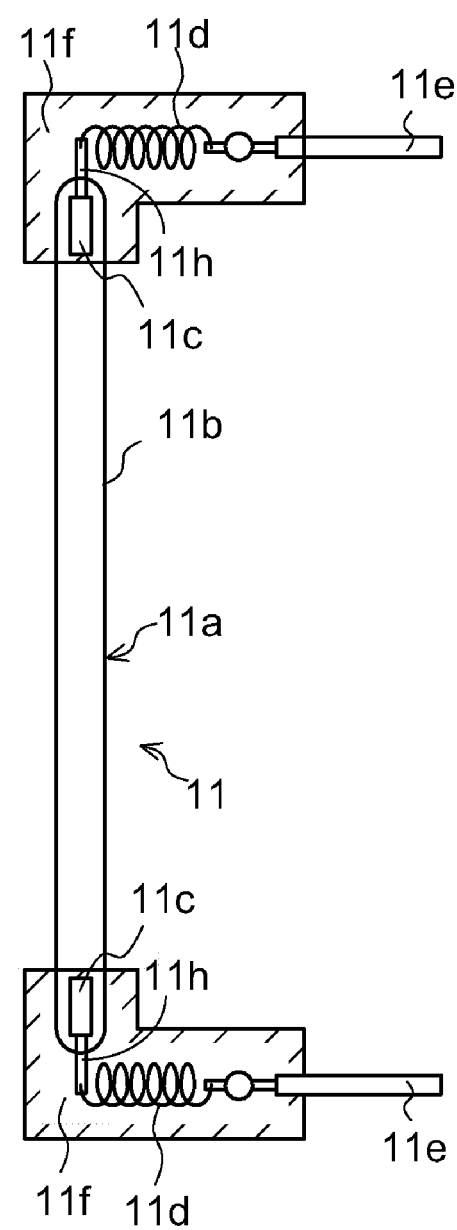
FIG. 4B is a diagram schematically showing the construction of still another example of the light source unit.

Alternatively, as shown in FIG. 4A, the coil 11d connected to the lead 11h connected to the discharge electrode 11c provided in one end portion of the cold-cathode tube 11a may be arranged such that the center axis of the coil 11d extends in a direction that is substantially perpendicular to the direction of the length of the cold-cathode tube 11a. Alternatively, as shown in FIG. 4B, the coils 11d connected one to each of the leads 11h connected respectively to the discharge electrodes 11c provided one in each end portion of the cold-cathode tube 11a may be both so disposed that the center axis of the coils 11d extends in a direction that is substantially perpendicular to the direction of the length of the cold-cathode tube 11a.

Figure 5A:
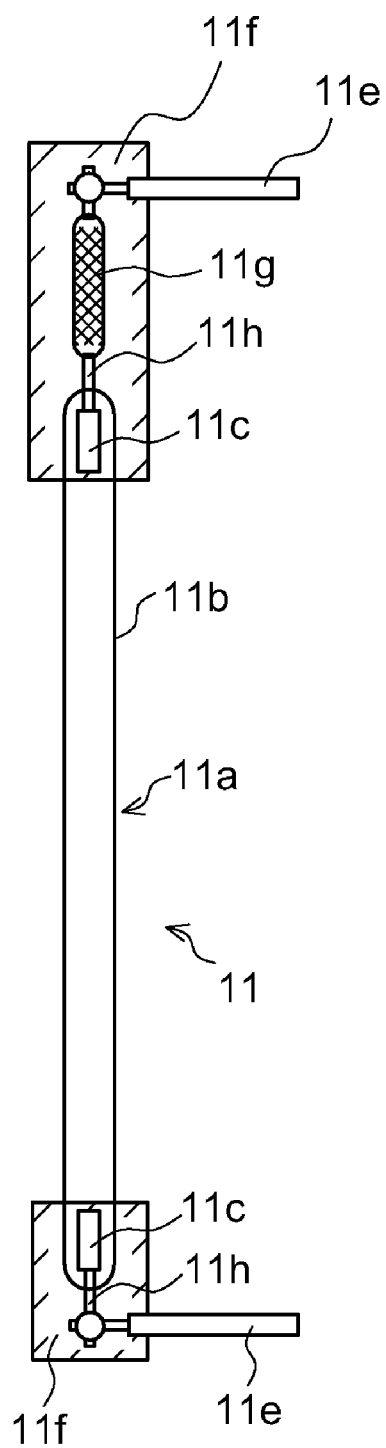
FIG. 5A is a diagram schematically showing the construction of still another example of the light source unit.

An inductance element other than a coil 11d as described above may be used. For example, as shown in FIG. 5A, a coaxial cable 11g as an inductance element may be connected to the lead 11h connected to the discharge electrode 11c provided in one end portion of the cold-cathode tube 11a. This coaxial cable 11g has an inner conductor disposed along the center axis thereof. This inner conductor is covered with an inner insulator, which is covered with an outer conductor. This outer conductor is covered with an outer insulating jacket. In this coaxial cable 11g, as current flows through the inner conductor, its impedance is increased by the outer conductor. Thus, the coaxial cable 11g functions as an inductance element having a positive characteristic.

Figure 5B:
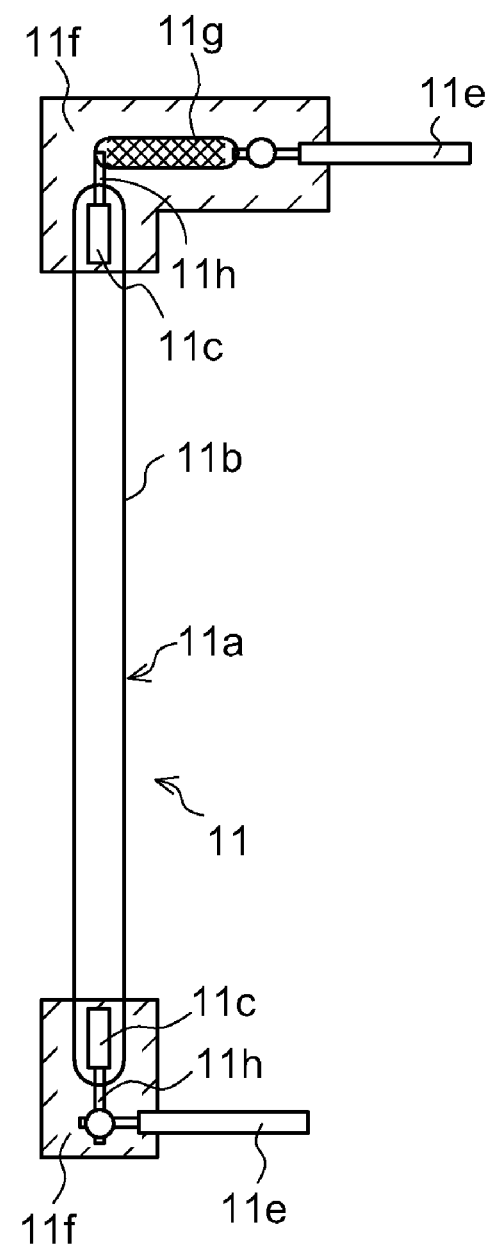
FIG. 5B is a diagram schematically showing the construction of still another example of the light source unit.

In this case, the coaxial cable 11g may be arranged such that its center axis is aligned in the direction of the length of the cold-cathode tube 11a. Alternatively, as shown in FIG. 5B, the coaxial cable 11g may be connected such that its center axis extends in a direction that is substantially perpendicular to the direction of the length of the cold-cathode tube 11a. Alternatively, though not illustrated, coaxial cables 11g may be connected one to each of the two discharge electrodes 11c with the center axis of the coaxial cables 11g aligned with, or extending in a direction that is substantially perpendicular to, the direction of the length of the cold-cathode tube 11a.

Figure 6:
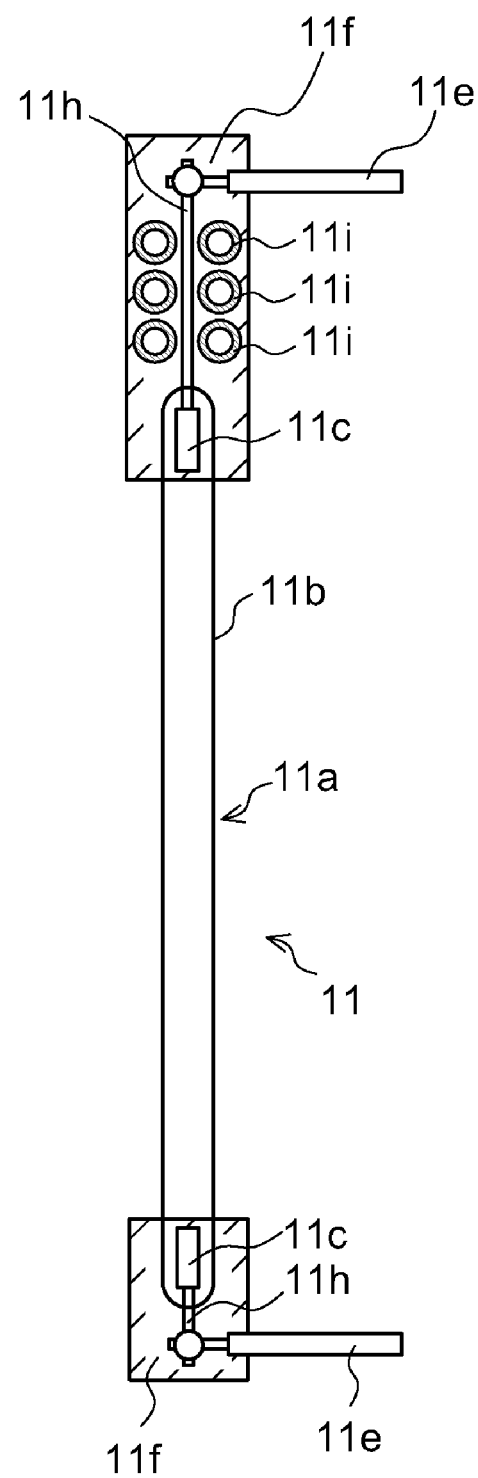
FIG. 6 is a diagram schematically showing the construction of still another example of the light source unit.

Alternatively, as shown in FIG. 6, an inductance element may be provided by disposing a plurality of electrically conductive rings 11i, each hollow at the center, around the lead 11h connected to a discharge electrode 11c. In this case also, as current flows through the lead 11h, its impedance is increased by the electrically conductive rings 11i, and thus the electrically conductive rings 11i function as an inductance element having a positive characteristic. Instead of a plurality of electrically conductive rings 11i, a coil formed of electrically conductive wire may be wound in a spiral shape around the lead 11h. Alternatively, instead of a plurality of electrically conductive rings 11i, a closed circuit (an electrically conductive tube) may be arranged so as to produce an inductance, that is, in such a direction that the magnetic flux around the axis along which the current flows through the cold-cathode tube 11a penetrates the closed circuit. In this case, an inductance element can be formed easily inside an insulating holder 11f of the cold-cathode tube 11a.

Figure 7A:
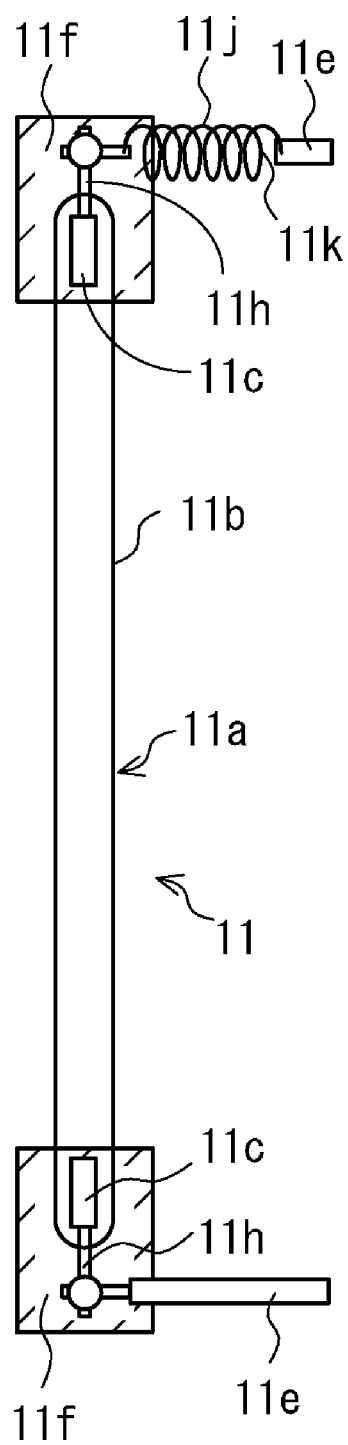
FIG. 7A is a diagram schematically showing the construction of still another example of the light source unit.
Figure 7B:
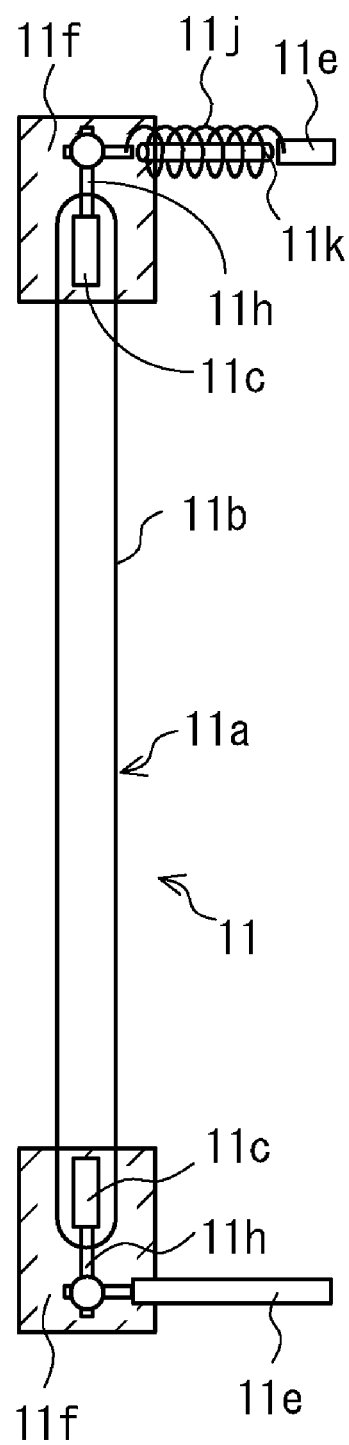
FIG. 7B is a diagram schematically showing the construction of still another example of the light source unit.

Alternatively, as shown in FIG. 7A, part of a wiring member 11e of a harness originally designed to be connected to the lead 11h connected to the discharge electrode 11c may be shaped into a coil 11j and is then connected to the lead 11h. Instead of shaping part of the wiring member 11e into a coil, a separate coil may be used as the coil 11j. Alternatively, as shown in FIG. 7B, a core member 11k may be disposed along the center axis of the coil 11j. In the coil 11j, as in the coil 11d, as a current flows therethrough, its impedance increases, and thus the coil 11j functions as an inductance element having a positive characteristic. Moreover, disposing the core member 11k along the center axis of the coil 11j helps stabilize the shape and the inductance thereof. Although FIGS. 7A and 7B show the coil 11j disposed outside the insulating holders 11f, the coil 11j may be covered with insulating holders 11f in order to protect the coil 11j and prevent its inductance from being affected by extraneous influences.

Figure 8A:
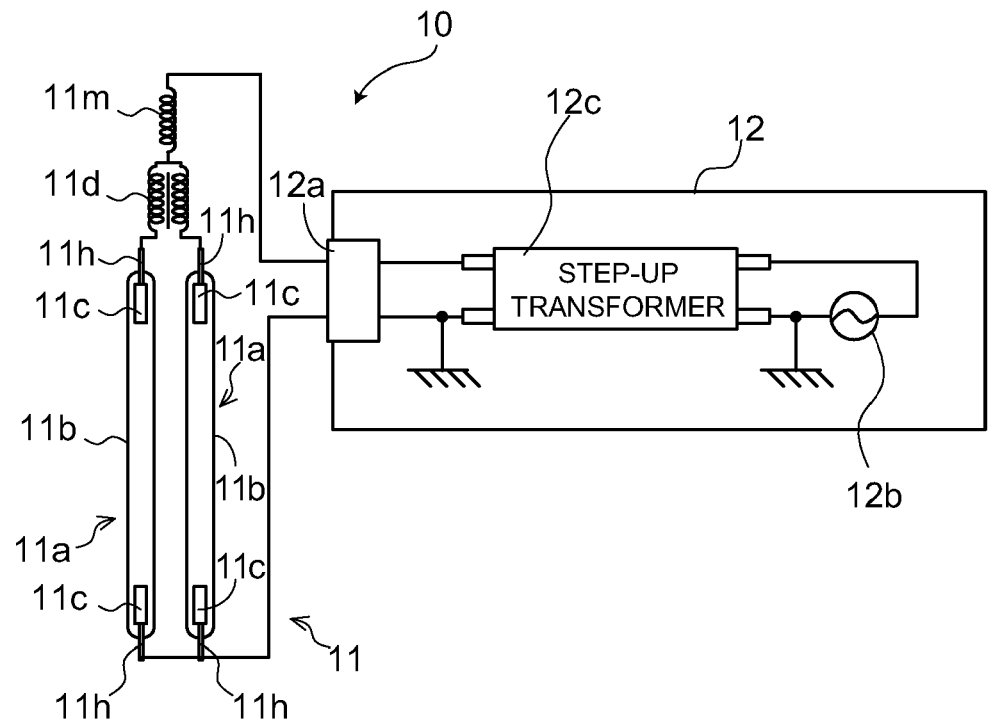
FIG. 8A is a diagram schematically showing the construction of another example of the backlight.

FIG. 8A is a diagram schematically showing a further example of the backlight 10. In this backlight 10, each light source unit 11 is provided with a magnetic coupling coil 11m that magnetically couples together the coils 11d provided one in each of two cold-cathode tubes 11a. Though not illustrated, a plurality of light source units 11, each including two cold-cathode tubes 11a, are connected in parallel with one another, and are then connected to the connector 12a of the control circuit 12.

In each light source unit 11, the coils 11d are connected one to each of the leads 11h connected, one for each of the two cold-cathode tubes 11a, to one of the discharge electrodes 11c thereof, and the magnetic coupling coil 11m is connected in series with those coils 11d. The magnetic coupling coil 11m is then connected to the connector 12a of the control circuit 12.

In the light source unit 11 constructed as described above, the magnetic coupling coil 11m magnetically couples together the coils 11d connected one to one of the discharge electrodes 11c of each of the two cold-cathode tubes 11a. This permits the currents flowing through the individual coils 11d to be controlled to be constant, and thus permits a constant current to be fed to each of the two cold-cathode tubes 11a. For example, when a current of 12 mA is flowing through the magnetic coupling coil 11m, it permits a current of 6 mA to flow through each cold-cathode tube 11a.

Figure 8B:
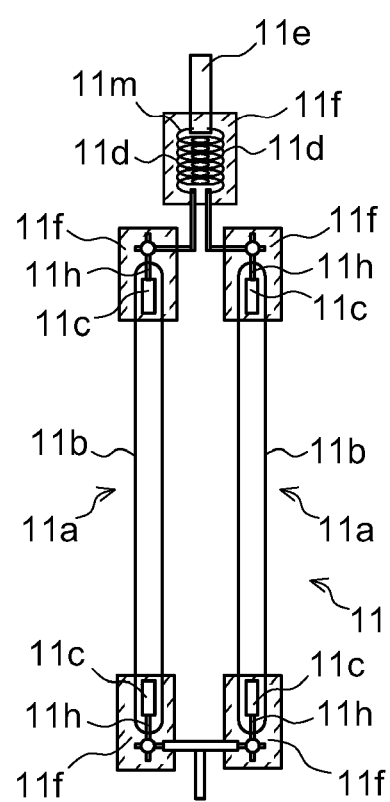
FIG. 8B is a diagram schematically showing the construction of a practical example of the light source unit used in the backlight shown in FIG. 8A.
Figure 10:
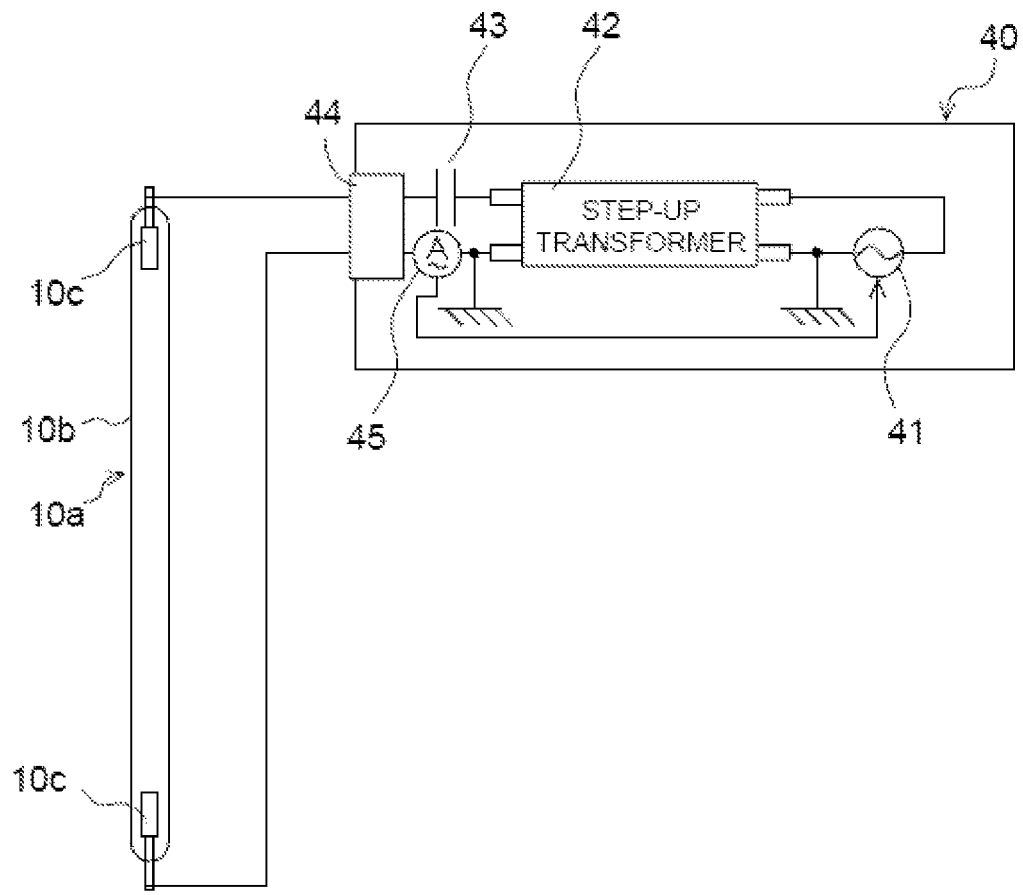
FIG. 10 is a diagram schematically showing an example of a conventional backlight.

In this case, more specifically, each light source unit 11 is constructed, for example, as shown in FIG. 8B. The two cold-cathode tubes 11a are arranged to be substantially parallel with each other, and, for each of them, insulating holders 11f are provided one at each end portion of the glass tube 11b thereof. The cold-cathode tubes 11a are, at both end portions thereof disposed adjacent to each other, covered with insulating holders 11f, through which leads 11h connected respectively to the discharge electrodes 11c of the cold-cathode tube 11a are led out. Of all the leads 11h, the two disposed on the same side of the cold-cathode tubes 11a are, at the other end, connected one to each of the coils 11d. The other ends of the coils 11d are connected together, and are connected to the other end of the magnetic coupling coil 11m. The coils 11d connected to the discharge electrodes 11c and the magnetic coupling coil 11m are all so disposed that their axis is aligned substantially parallel to the cold-cathode tubes 11a.

FIG. 9A shows another example of a light source unit 11 having two cold-cathode tubes 11a magnetically coupled together. In the light source unit 11 of this example, the two cold-cathode tubes 11a disposed substantially parallel to each other are, at each end portion disposed adjacent to each other, covered with one insulating holder 11f. Inside each insulating holder 11f, there are disposed two coils 11d connected, respectively via leads 11h, one to each of the discharge electrodes 11c provided in the end portions of the cold-cathode tubes 11a covered by that insulating holder 11f, and a magnetic coupling coil 11m connected in series with those two coils 11d. All these coils 11d and 11m are disposed between the end portions of the two cold-cathode tubes 11a so as to be parallel thereto. The magnetic coupling coil 11m is connected to a wiring member 11e, which is lead out through the insulating holder 11f.

The light source unit 11 constructed as described above is assembled as shown in FIG. 9B. Each insulating holder 11f is separated into an insulator holder body 11s and an insulator holder lid 11t. In a central portion inside the insulator holder body 11s, two coils 11d and one magnetic coupling coil 11m are disposed substantially parallel to one another. One end of each coil 11d is led out of the insulator holder body 11s. In the insulator holder body 1 is, on each side of the coils 11d and the magnetic coupling coil 11m, a through hole 11u is formed substantially parallel thereto. Near one end of each through hole 11u, the end of a coil 11d led out of the insulator holder body 11s is located.

By the use of the insulating holders 11f structured as described above, the light source unit 11 shown in FIG. 9A is assembled. The assembly of the light source unit 11 proceeds as follows. First, one end portions of the two cold-cathode tubes 11a are inserted into the through holes 11u formed in an insulator holder body 11s. The leads 11h connected to the discharge electrodes 11c provided in the thus inserted end portions are soldered respectively to one ends of the coils 11d provided near the through holes 11u. Then, an insulator holder lid 11t is fitted to the insulator holder body 11s. Then, likewise, another insulator holder body 11s is fitted to the other end portions of the cold-cathode tubes 11a. Then, the leads 11h connected to the discharge electrodes 11c are soldered to the other ends of the coils 11d. Then, an insulator holder lid 11t is fitted to the insulator holder body 11s. In this way, the light source unit 11 shown in FIG. 9A is assembled.

In the light source unit 11 constructed as described above, since the magnetic coupling coils 11m are connected to the coils 11d provided at the end portions of the individual cold-cathode tubes 11a, by controlling the current fed to the magnetic coupling coil 11m, it is possible to control the currents fed to the two cold-cathode tubes 11a. This makes it possible to omit from the control circuit 12 a circuit or the like for feeding a constant current to the cold-cathode tubes 11a, and thus helps simplify the configuration of the control circuit 12. Moreover, since the coils 11d and the magnetic coupling coils 11m are provided at the end portions of the individual cold-cathode tubes 11a, it is possible to reduce the influence of stray capacitances at the end portions of the cold-cathode tubes 11a. Furthermore, even when a high voltage is applied to the cold-cathode tubes 11a, it is possible to feed constant currents to the cold-cathode tubes 11a.

Through the combined use of the magnetic coupling coil 11m with the two coils 11d, the currents fed respectively to the cold-cathode tubes 11a can be controlled to remain constant when the conditions noted below are fulfilled. Generally, the magnetic circuit of a magnetic coupling element is prevented from saturation under the following condition:

$$2 \times Bm \times S \times Np \geqq Vin/F \qquad (1)$$

where

Bm represents the saturation magnetic flux density (in Tesla, dependent on temperature) of the coupling portion magnetic material (ferrite core);

S represents the minimum area of the coupling portion;

Np represents the number of turns of the primary coil;

Vin represents the input voltage (in V); and

F represents the frequency.

Among a plurality of lamps, the voltages applied thereto may vary in the order of 100 V (about 10% of 1 000 V), and the driving frequency of cold-cathode tubes is typically about 50 kHz. Hence, through the combined use of the magnetic coupling coil 11m with the two coils 11d, the currents fed respectively to the cold-cathode tubes 11a can be controlled to remain constant when Bm, S, and N are so determined as to fulfill the following condition:

$$2 \times Bm \times S \times N \geqq 100 \text{ V}/50\,000 \text{ Hz} = 2.0 \times 10^{-3} \text{ (V/Hz)} \qquad (2)$$

where

N represents the number of turns of the primary or secondary coil (here, since two coils are magnetically coupled with one coil, the numbers of turns of the primary and secondary coils are equal).

With respect to the mutual inductance M, the electromotive force on the secondary side is given by the following formula:

$$\epsilon \propto M \times dI \times dt \qquad (3)$$

where $\epsilon$ represents the electromotive force on the secondary side; and

I represents the current.

Suppose, for example, the currents fed to two lamps vary by about 1 mA. In this case, a voltage higher than 100 V is needed, and therefore it is advisable to determine the mutual inductance M so that it fulfills the following condition:

$$|M \times dI/dt| \geqq |100 \times \sqrt{2} \times \sin(2\pi \times 50 \text{ kHz} \times t)| \qquad (4)$$

Here, the right side of formula (4) represents the time variation of the effective voltage as observed when it is 100 V. Substituting specific values in formula (4) gives:

$$|M \times d(1 \text{ mA} \times \sqrt{2} \cos(2\pi \times 50 \text{ kHz} \times t))/dt| \geqq |100 \times \sqrt{2} \times \sin(2\pi \times 50 \text{ kHz} \times t)| \qquad (5)$$

This is rearranged as:

$$M \times 222.2 \geqq 141.4 \qquad (6)$$

That is:

$$M \geqq 0.6364 \qquad (7)$$

From the foregoing, it will be understood that, when the mutual inductance M is equal to or higher than 636.4 mH, a variation of about 1.0 mA during driving at 50 kHz, an effective voltage of about 100 V appears as the electromotive force on the secondary side. This permits the current to be controlled to remain constant.

FIGS. 2 to 9B all show examples in which an inductance element is disposed near an end portion of a cold-cathode tube 11a. This is because, as is true with the magnetic coupling coil 11m as described above, when an inductance element is connected via a long conductor to a lead 11h of the cold-cathode tube 11a, there may arise too high a stray capacitance to ignore. This stray capacitance may cause the voltage across or the current through the cold-cathode tube 11a to vary. To avoid this, it is preferable, as illustrated, to minimize the influence of a stray capacitance by disposing an inductance element near an end portion (lead 11h) of a cold-cathode tube 11a.

Hereinbefore, the present invention has been described by way of preferred embodiments. The present invention, however, should not be interpreted as limited to those preferred embodiments described above. It should be understood that the scope of the present invention should be interpreted only in light of the scope of the appended claims. It should be understood that a person skilled in the art can practice the present invention within an equivalent scope in light of the description of the specifically described preferred embodiments thereof, on the basis of the description of the present invention and technical common sense. It should be understood, for example, that the glass tube 11b described above is merely one example of a tube formed of an insulating material (that is, an insulating tube) and thus may be formed of, instead of glass, any other insulating material such as a crystalline material or resin (or an organic substance). It should be understood that the insulating tube does not necessarily have to be so transparent as to have a light transmissivity of 100%, provided that the light generated inside it can be extracted out of it (transmitted therethrough), and may be colorless or colored. It should be understood, for example, that the cold-cathode tube 11a described above is not limited to a cold-cathode fluorescent tube but and is merely an example of a discharge light source tube filled with a discharge gas (having it sealed therein), examples of which include one, like the cold-cathode fluorescent tube 11a, that exploits the glow discharge region and one that exploits the arc discharge region.

By the use of a light source unit according to preferred embodiments of the present invention, it is possible to simplify the control circuit, to minimize the increase in cost, and to reduce the footprint on a circuit board. Thus, light source units according to preferred embodiments of the present invention are suitable for use in increasingly sought-after large-screen, slim television monitors incorporating large-size light source units. Light source units according to preferred embodiments of the present invention are suitable also as light source units for use in the display section of notebook personal computers and other portable electronic appliances that require compact control circuits.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A light source unit comprising:
   a discharge light source tube having discharge electrodes provided one in each end portion of an insulating tube whose interior is filled with a discharge gas; and
   an inductance element that is electrically connected to at least one of the discharge electrodes of the discharge light source tube; wherein
   the insulating tube includes leads, one end of each of the leads is connected to a corresponding one of the discharge electrodes and the other end of each of the leads extends out of the insulating tube;
   the inductance element includes at least one of an electrically conductive ring and an electrically conductive tube disposed around at least one of the leads; and
   the at least one of the electrically conductive ring and the electrically conductive tube is arranged such that a magnetic flux generated by current flowing through the leads penetrates a closed circuit defined by the at least one of the electrically conductive ring and the electrically conductive tube.

2. The light source unit according to claim 1, wherein the inductance element is disposed inside an insulating material.

3. The light source unit according to claim 2, wherein the insulating material is rubber.

4. The light source unit according to claim 2, wherein the insulating material covers a portion of the discharge light source tube so as to define a holder arranged to hold the discharge light source tube.

5. The light source unit according to claim 1, wherein, in the inductance element, the at least one of the electrically conductive ring and the electrically conductive tube is disposed separately from the leads.

6. The light source unit according to claim 1, wherein the inductance element is a coaxial cable.

7. An illumination apparatus for use in a display apparatus, the illumination apparatus comprising:
   a light source unit including:
      a discharge light source tube having discharge electrodes provided one in each end portion of an insulating tube whose interior is filled with a discharge gas; and
      an inductance element that is electrically connected to at least one of the discharge electrodes of the discharge light source tube; and
   a control circuit that produces an intermittent output voltage by stepping up, with a stepping-up transformer, a low-voltage alternating current from a low-voltage alternating current source; wherein
   as a result of the output voltage being applied to the light source unit, the light source unit lights to illuminate a display panel;
   the insulating tube includes leads, one end of each of the leads is connected to a corresponding one of the discharge electrodes and the other end of each of the leads extends out of the insulating tube;
   the inductance element includes at least one of an electrically conductive ring and an electrically conductive tube disposed around at least one of the leads; and
   the at least one of the electrically conductive ring and the electrically conductive tube is arranged such that a magnetic flux generated by current flowing through the leads penetrates a closed circuit formed by the at least one of the electrically conductive ring and the electrically conductive tube.

8. The illumination apparatus for use in a display apparatus according to claim 7, wherein a plurality of light source units are provided and are connected in parallel with the control circuit so as to be driven thereby.

9. A display apparatus comprising:
   an illumination apparatus according to claim 8; and
   a display panel illuminated by the illumination apparatus.

10. A display apparatus comprising:
    an illumination apparatus according to claim 7; and
    a display panel illuminated by the illumination apparatus.

11. An illumination apparatus for use in a display apparatus, the illumination apparatus comprising:
    a light source unit including:
       a plurality of discharge light source tubes each having discharge electrodes provided one in each end portion of an insulating tube whose interior is filled with a discharge gas;
       inductance elements that are, one for each of the discharge light source tubes, electrically connected to at least one of the discharge electrodes thereof; and
       a magnetic flux coupling member that is connected in series with the inductance elements and magnetically couples together the inductance elements; and
    a control circuit that produces an intermittent output voltage by stepping up, with a stepping-up transformer, a low-voltage alternating current from a low-voltage alternating current source; wherein
    as a result of the output voltage being applied to the light source units, the light source units light to illuminate a display panel;
    the insulating tube includes leads, one end of each of the leads is connected to a corresponding one of the discharge electrodes and the other end of each of the leads extends out of the insulating tube;

the inductance elements include at least one of the electrically conductive ring and the electrically conductive tube disposed around at least one of the leads; and the at least one of the electrically conductive ring and the electrically conductive tube is arranged such that a magnetic flux generated by current flowing through the leads penetrates a closed circuit formed by the at least one of the electrically conductive ring and the electrically conductive tube.

12. The illumination apparatus for use in a display apparatus according to claim 11, wherein a plurality of light source units are provided and are connected in parallel with the control circuit so as to be driven thereby.

13. A display apparatus comprising:
an illumination apparatus according to claim 12; and
a display panel illuminated by the illumination apparatus.

14. A display apparatus comprising:
an illumination apparatus according to claim 11; and
a display panel illuminated by the illumination apparatus.

15. A light source unit comprising:
a plurality of discharge light source tubes each having discharge electrodes provided one in each end portion of an insulating tube whose interior is filled with a discharge gas;

inductance elements that are, one for each of the discharge light source tubes, electrically connected to at least one of the discharge electrodes thereof; and a magnetic flux coupling member that is connected in series with the inductance elements and magnetically couples together the inductance elements; wherein the inductance elements magnetically coupled together by the magnetic flux coupling member each includes a coupling portion magnetic material;

the coupling portion magnetic material has a saturation magnetic flux density $Bm$;

each of the inductance elements includes a coil having $Np$ turns and includes a current having an input voltage $Vin$ and a frequency $F$;

the magnetic flux coupling member magnetically couples a pair of the inductance elements that have a magnetic coupling portion with a minimum area $S$ and is connected in series with the pair of the inductance elements; and the light source unit satisfies $2 \times Bm \times S \times Np \geqq Vin/F$.

* * * * *